United States Patent [19]

Desimone et al.

[11] 3,886,217

[45] May 27, 1975

[54] PROCESS FOR THE PREPARATION OF ALPHA, BETA-ETHYLENIC KETONES SUCH AS DELTA[3]-CIS-PSEUDO IONONES

[75] Inventors: Robert S. Desimone, Willingboro; Peter S. Gradeff, Andover, both of N.J.

[73] Assignee: Rhodia, Inc., New York, N.Y.

[22] Filed: Feb. 1, 1973

[21] Appl. No.: 328,558

[52] U.S. Cl. ........................... 260/593 R; 260/586 R
[51] Int. Cl. ............................................ C07c 49/20
[58] Field of Search ................ 260/587, 593, 586 R

[56] References Cited
UNITED STATES PATENTS

| | | | |
|---|---|---|---|
| 3,029,287 | 4/1962 | Riechen et al. | 260/587 |
| 3,456,015 | 7/1969 | Riechen et al. | 260/593 R |
| 3,574,715 | 4/1971 | Riechen et al. | 260/593 R |

FOREIGN PATENTS OR APPLICATIONS

| | | | |
|---|---|---|---|
| 666,786 | 7/1963 | Canada | 260/593 R |

*Primary Examiner*—Bernard Helfin
*Assistant Examiner*—James H. Reamer

[57] ABSTRACT

A process is provided for the preparation of $\alpha,\beta$-ethylenic ketones by the condensation of aliphatic and cycloaliphatic tertiary acetylenic carbinols and especially for the preparation of $\Delta^3$-cis-pseudo ionones by the condensation of dehydrolinalool and derivatives thereof with alkenyl ethers at from about 80° to about 150°C. in the presence of cupric sulfate. The $\Delta^3$-cis-pseudo ionones can be cyclized to produce the corresponding $\alpha$-, $\beta$-, and $\gamma$-cis-ionones or alkyl ionones. Methods are also described for rearranging the $\Delta^3$-cis-pseudo ionones to the normally encountered trans-pseudo ionones which in turn can be converted to the trans-ionones.

14 Claims, No Drawings

PROCESS FOR THE PREPARATION OF ALPHA, BETA-ETHYLENIC KETONES SUCH AS DELTA³-CIS-PSEUDO IONONES

Ionones occupy a prominent place in perfumery. It would be hard today to find a perfume composition that does not contain an ionone. More than one hundred ionones are known; the most widely used ones are β-ionone, α-ionone, the methyl ionones, and the irones. β-ionone also is a principal intermediate in the preparation of synthetic Vitamin A.

The importance of the ionones is reflected in the effects reported in the literature so to find suitable ways for their manufacture. All of the commercial methods start from citral or dehydrolinalool, and proceed via the pseudo ionones to the ionones. For example, citral is condensed with acetone or methyl ethyl ketone, and the pseudo ionone cyclized to ionone. Dehydrolinalool is reacted with ethyl acetoacetate by Carroll's synthesis to pseudo ionone, followed by cyclization. Condensation of citral with 2-ethoxy-propene yields the triethoxy derivative of pseudo ionone which leads to the pseudo ionone (U.S. Pat. No. 3,109,861, dated Nov. 5, 1963, to Guex, Marbet and Montavon). Pseudo ionone also is prepared from dehydrolinalool and methyl acetoacetate or diketene. The rearrangement of dehydrolinalool acetate to enol acetate of citral followed by reaction with acetone and the rearrangement of the allenic ketone formed by condensation of a ketal or an enol ether and dehydrolinalool (U.S. Pat. No. 3,029,287, dated Apr. 10, 1962, to Marbet and Saucy) both yield pseudo ionone.

β-Ionone, for instance, is obtained by cyclization of pseudo ionone under the influence of acid:

One should notice that in the case of both β-ionone and pseudo ionone, the configuration of the Δ³ double bond conjugated to the carbonyl is trans. This is the normal form. The cis-Δ³ configuration of pseudo ionone has been postulated as theoretically possible, but not favored, and unstable. In fact, efforts to prepare the cis-isomer have all failed (*J. Chem. Soc.* 1965 5528). Two cis-isomers are possible, depending on the configuration at the Δ⁵ double bond:

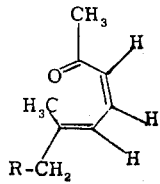

Cis-Δ³, Trans-Δ⁵

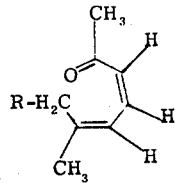

Cis-Δ³, Cis-Δ⁵

R= (CH₃)₂-C=CH-CH₂-

Although the cis-pseudo ionone has not been prepared, cis-β-ionone can be prepared by another route, from trimethyl-2,6,6-cyclohexanone, which is reacted with acetylene to form trimethyl-ethynyl-cyclohexanol, followed by a Grignard reaction, as shown below:

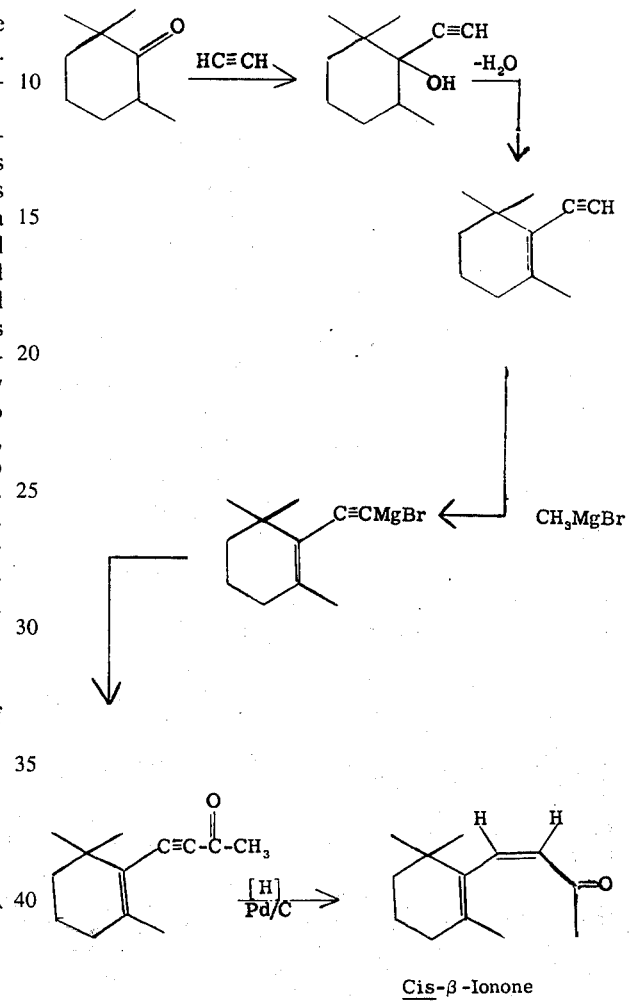

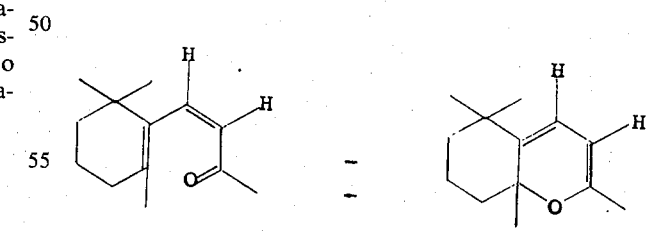

Cis-β-Ionone

The cis-α- or β-ionone can also be obtained by ultraviolet irradiation of α- or β-trans-ionones.

It is believed that the cis-β-ionone is in equilibrium with the pyran structure:

This is discussed in an article published in *J. Am. Chem. Soc.* 88 619–20 (1966). Most recently, Martell, et al. (*J. Org. Chem.* 37 2992, (1972)) have also demonstrated that Δ³-cis-ionone exists in equilibrium with the pyran form. The preparation of cis-α-ionone from the trans-isomer by irradiation is described by Buchi and Wang in *Helv. Chem. Acta* 160 1339 (1955). However, since the cis-β-ionone apparently also is present in the open chain structure at least to some extent, and the equilibrium is such that the mixture behaves as though it were all in the open chain structure, it is unnecessary to consider the pyran structure in the specification and claims of this application, and it will not be referred to further.

It has now been discovered that the cis-$\Delta^3$-pseudo ionones, compounds previously unknown and considered to be too unstable to exist, can be prepared from dehydrolinalool and its homologues by reaction with alkoxy propenes or butenes in the presence of cupric sulfate as a catalyst at a temperature within the range from about 80° to about 150°C. Furthermore, it appears that of the two possible cis-$\Delta^3$ isomers, cis-66 $^3$-cis$\Delta^5$; and cis-$\Delta^3$-trans-$\Delta^5$; only one is present, and interpretation of some analytical data points to the cis-$\Delta^3$-trans-$\Delta^5$ isomer.

It is quite surprising that the cis-$\Delta^3$ isomer is obtained in this process, since all other known processes (such as that of U.S. Pat. No. 3,029,287) starting from dehydrolinalool and its homologues lead to the trans-$\Delta^3$-pseudo ionones. It appears that the cupric sulfate catalyst is primarily responsible for this remarkable result, and the cupric sulfate also makes possible the obtention of the cis-$\Delta^3$-isomer in a one step process.

The cis-$\Delta^3$-pseudo ionone can be converted to the cis-ionone which exists in equilibrium with the $\alpha$-pyran form, and this can be isomerized to the trans-ionone. The cis-$\Delta^3$-pseudo ionone can also be isomerized to the trans-$\Delta^3$-pseudo ionone, and this can be converted to the trans-ionone.

Accordingly, in the process of the instant invention, one of the class of dehydrolinalool and its derivatives thereof is reacted with an isoalkenyl ether at a temperature within the range from about 80° to about 150°C. in the presence of cupric sulfate to produce the corresponding $\Delta^3$-cis-pseudo-ionone or $\Delta^3$-cis-pseudo methyl ionone. The alkenyl group of the ether has from three to four carbon atoms, and the class includes isopropenyl and isobutenyl lower alkyl ethers. The substituent groups of the dehydrolinalool include alkyl, alkenyl, cycloalkyl and cycloalkenyl, the alkyl and alkenyl groups having from one to about thirty carbon atoms, and the cycloalkyl and cycloalkenyl having from three to about thirty carbon atoms. The lower alkyl and alkenyl homologues, the alkyl having from one to four carbon atoms, and the alkenyl from two to four carbon atoms, are preferred. While some trans-$\Delta^3$-isomer may be obtained, the cis-$\Delta^3$-isomer is produced in predominant proportion.

The cis-$\Delta^3$-pseudo ionones offer a convenient and direct route for preparation of the corresponding cis-ionones and cis-methyl ionones.

the cis-$\Delta^3$-pseudo ionones can be isomerized to the trans-$\Delta^3$-isomers, which lead to the corresponding known ionones and methyl ionones.

The process of the invention is applicable to any tertiary acetylenic carbinol having the general formula:

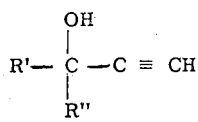

wherein:
a. R' is selected from the group consisting of:

(i)

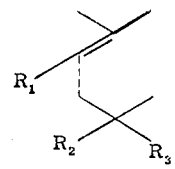

wherein $R_1$, $R_2$ and $R_3$ are selected from the group consisting of hydrogen, lower alkyl and lower alkenyl, having from one to about four carbon atoms;

(ii)

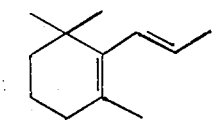

(iii)

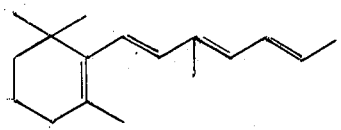

(iv)

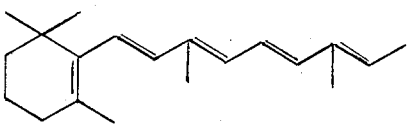

b. R'' is selected from the group consisting of lower alkyl and lower alkenyl, having from one to about four carbon atoms.

In the case where the isoalkenyl ether is an isopropenyl ether, the condensation reaction of the invention proceeds as represented by Scheme I to produce an $\alpha$, $\beta$-ethylenic ketone:

SCHEME I

R = lower alkyl having from one to about four carbon atoms

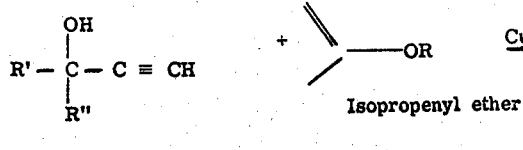

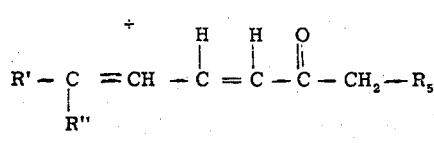

α, β-ethylenic ketone I

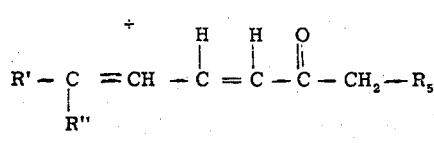

α, β-ethylenic ketone II

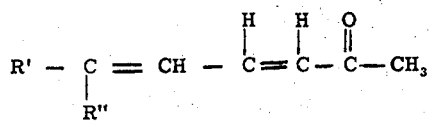

α, β-ethylenic ketone

When the isoalkenyl ether is an isobutenyl or higher alkenyl ether, the condensation reaction proceeds as shown in Scheme II, to produce two or more isomeric α, β-ethylenic ketones:

SCHEME II

R and R₅ = lower alkyl having from one to four carbon atoms

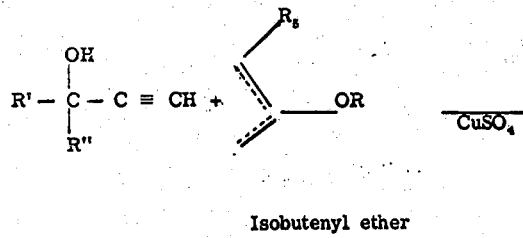

Isobutenyl ether

The class of tertiary acetylenic alcohols having a dehydrolinalool structure is an example. The dehydrolinalools to which the process of the invention is applicable have the general formula:

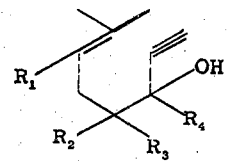

wherein $R_1$, $R_2$ and $R_3$ are selected from the group consisting of hydrogen, lower alkyl and lower alkenyl, as indicated above, having up to about four carbon atoms, and $R_4$ is selected from the group consisting of lower alkyl and lower alkenyl having up to about four carbon atoms.

In the case where the isoalkenyl ether is a isopropenyl ether, the application to the class of dehydrolinalools of the reactions of the invention result in a cis-Δ³-pseudo ionone, and can be represented by Scheme III:

SCHEME III

R = lower alkyl having from one to four carbon atoms

Reaction (a) - Condensation

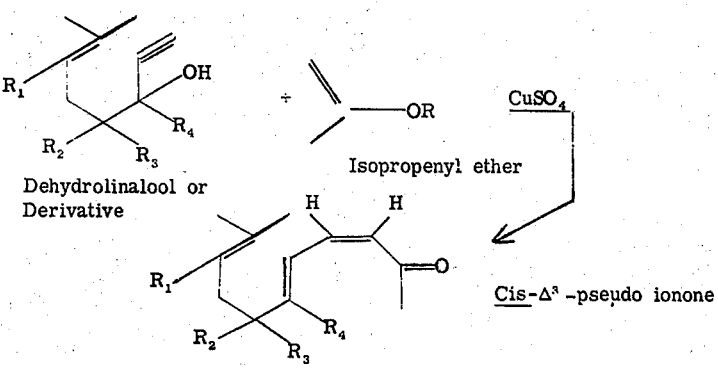

Dehydrolinalool or Derivative

Isopropenyl ether

Cis-Δ³-pseudo ionone

Reaction (b) - Isomerization

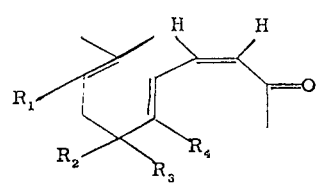

Cis-Δ³-pseudo ionone

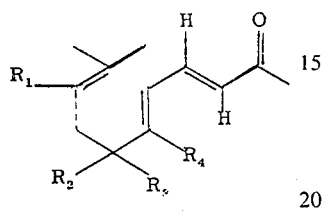

Trans-Δ³-pseudo ionone

Reaction (c) - Cyclization

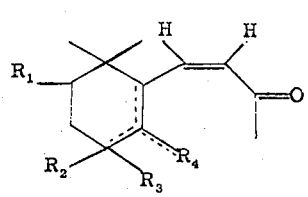

Cis-Δ³-pseudo ionone

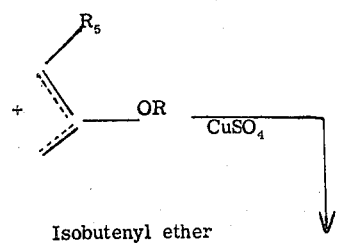

Cis (α-, β-, γ-) ionone

When the isoalkenyl ether is an isobutenyl or higher alkenyl ether, the application to the class of dehydrolinalools of the reactions of the invention result in two or more isomeric cis-Δ³-pseudo ionones, and can be represented by Scheme IV:

SCHEME IV

R and $R_5$ = lower alkyl having from one to four carbon atoms

Reaction (a) - Condensation

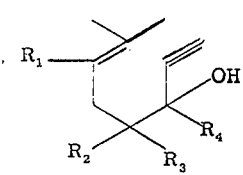 +  $\xrightarrow{CuSO_4}$

Dehydrolinalool or Homologue    Isobutenyl ether

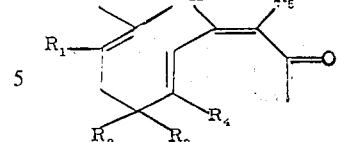 and/or

Cis-Δ³-iso alkyl pseudo ionone

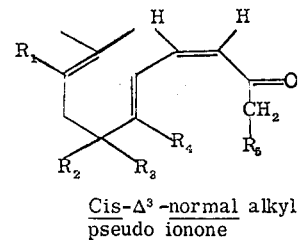

Cis-Δ³-normal alkyl pseudo ionone

Reaction (b) - Isomerization to trans-Δ³-isomer

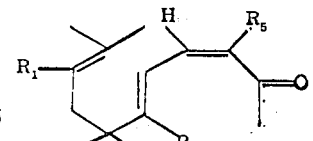 and/or

Cis-Δ³-iso alkyl pseudo ionone

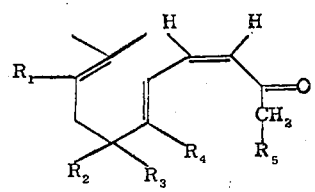

Cis-Δ³-normal alkyl pseudo ionone

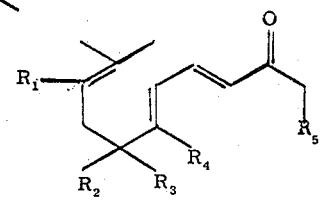 and/or

Iso alkyl pseudo ionone    Normal alkyl pseudo ionone

Reaction (c) - Cyclization

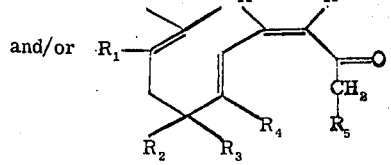

Cis-Δ³-iso alkyl pseudo ionone    and/or    Cis-Δ³-normal alkyl pseudo ionone

↓

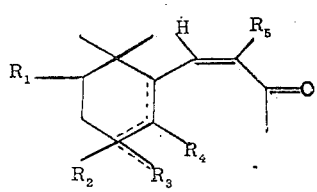

Cis-iso alkyl ionone and/or 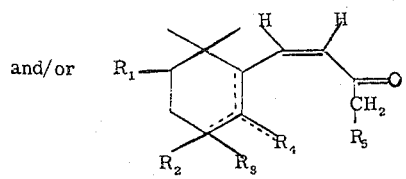

Cis-normal alkyl ionone

While the process in accordance with the invention is operative with lower isoalkenyl ethers in which $R_5$ is higher than methyl, such as ethyl, propyl, and isobutyl, the process is of major commercial interest when $R_5$ is methyl.

The terms "cis-$\Delta^3$-pseudo ionone," "cis-$\Delta^3$-iso alkyl pseudo ionone" and "cis-$\Delta^3$-normal alkyl pseudo ionone" are used generically herein to refer to compounds of the formulae represented above. Likewise, the terms "cis-ionone" and "cis-alkyl ionone" are used generically to refer to cis-ionones of the formulae represented above. However, it will be apparent that isopropenyl ethers produce pseudo ionones, and that isobutenyl ethers produce cis-$\Delta^3$-alkyl pseudo ionones. The cis-alkyl-pseudo ionones exist in iso and normal forms. Upon cyclization, both pseudo ionones and alkyl pseudo ionones produce mixtures of cis-$\alpha$-, $\beta$-, and $\gamma$-ionones and cis-alkyl ionones.

It will of course be understood that when $R_2$ and $R_3$ are both lower alkyl, the $\alpha$-ionone isomers do not exist.

During the coupling of the isoalkenyl ether with the tertiary acetylenic carbinol, the R substituent of the isoalkenyl ether is converted to the corresponding alcohol which is normally trapped by the excess of isoalkenyl ether.

When $R_1$, $R_2$, and $R_3$ are hydrogen and $R_4$ is methyl, the acetylenic alcohol is dehydrolinalool. Condensation of dehydrolinalool with an isopropenyl ether produces cis-$\Delta^3$-pseudo ionone, and the condensation of dehydrolinalool with isobutenyl ethers produces cis-$\Delta^3$-methyl pseudo ionone in both iso and normal forms.

Derivatives and homologues of dehydrolinalool in like manner give the corresponding pseudo ionones and cis-$\Delta^3$-methyl pseudo ionones in iso and normal forms.

The process of the invention is applicable, for instance, to the following tertiary acetylenic carbinols:

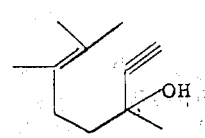 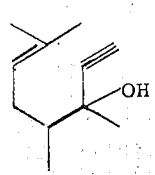

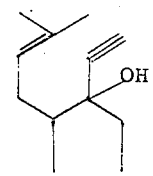

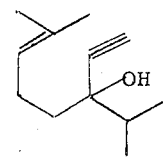

iso-$C_5H_{11}$

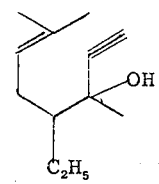

$C_2H_5$

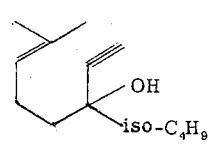

iso-$C_4H_9$

These lead to the preparation of the following exemplary cis-$\alpha$-ionones, when an isopropenyl ether is used as a reagent, in Scheme I:

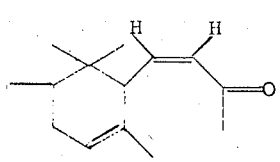 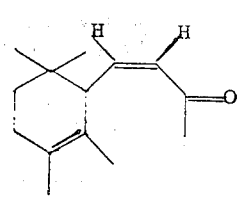

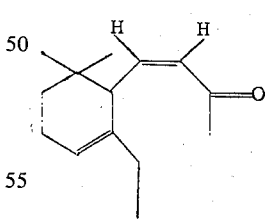 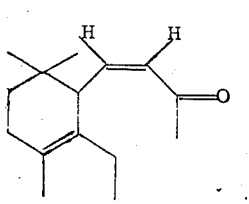

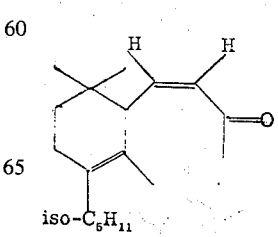 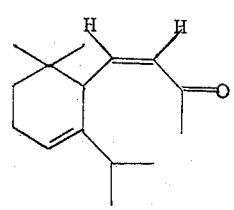

iso-$C_5H_{11}$

—Continued

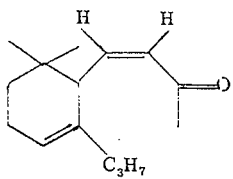 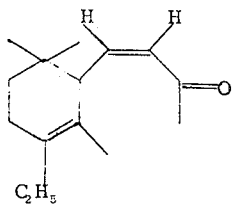 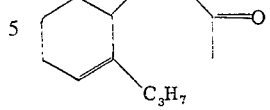

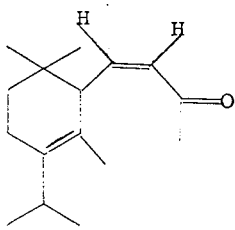 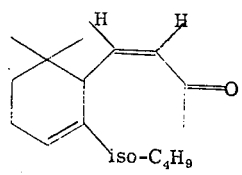 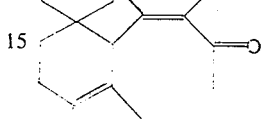

In the case when $R_2$ and $R_3$ are both alkyl, for instance,

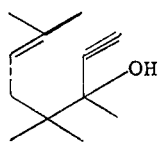

the corresponding cis-ionones are only β- and γ-:

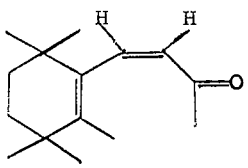

and

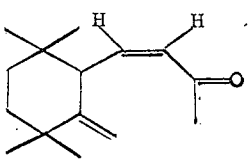

These lead to preparation of the following exemplary cis-iso-methyl-ionones, when the corresponding isobutenyl ether is used as a reagent, in Scheme II:

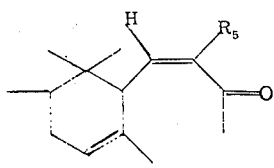 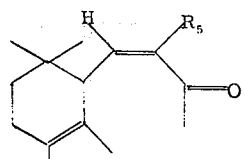

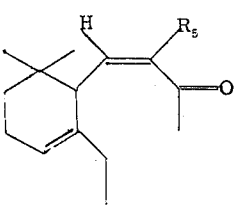 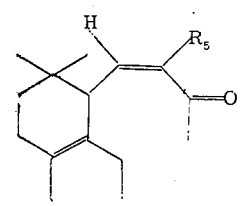

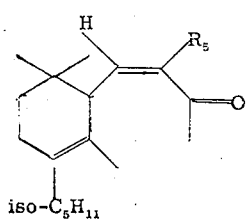 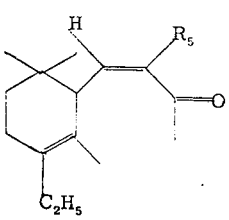 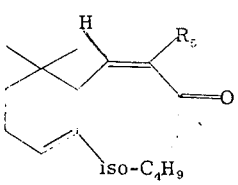

The process of the invention is also applicable, for instance, to the following cases:

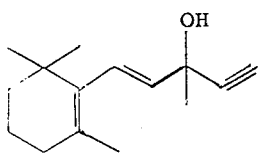

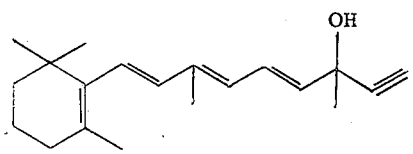

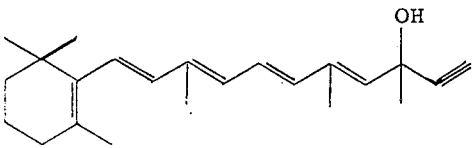

The reaction in accordance with the invention proceeds only in the presence of cupric sulfate. Cuprous copper salts are not effective, and neither is copper metal. Sulfates of other metals have been tried, but none has been found to be effective.

The amount of catalyst can be rather small. An amount as low as 1% is effective, but better results are obtained with amounts within the range from about 2% to about 5%. While larger amounts than 5% can be used, up to approximately 10%, there seems to be no advantage commensurate with the larger amount of catalyst employed.

In the use of cupric sulfate, which is insoluble in the reaction system, it appears that this is a type of heterogeneous catalytic reaction taking place on the surface of the catalyst. Not only is there no diminution in the activity of the catalyst in the course of the reaction, but it has been observed that the activity of the catalyst can be enhanced with use. Therefore, at the conclusion of the reaction, it is preferred that the catalyst be recovered, such as by filtration or centrifuging, and reused.

The reaction proceeds at temperatures from about 80° to about 150°C., preferably from 85° to 125°C. At temperatures below 80°C., the reaction does not proceed at a measurably practical rate. At temperatures in excess of 125°C., only the trans-$\Delta^3$-isomer is produced, and side reactions tend to reduce the yield even of the trans-isomer.

Because of the low boiling point of the isoalkenyl ether, the reaction is carried out in a closed vessel, so as to retain the isoalkenyl ether within the reaction mixture. Good agitation is desirable.

The reaction time is normally within the range from about 0.2 hour to about 3 days, depending upon the reagents, the degree of agitation, temperature and the amount of catalyst present. Usually, the reaction is complete within about 2 to about 40 hours.

Surprisingly, the reaction proceeds better and in a higher yield in the absence of a solvent. In the present of a solvent, some reaction takes place, but the yield is reduced.

The cis-$\Delta^3$-pseudo ionone after isolation from the reaction mixture can be cyclized to the ionone or alkyl ionone using an acidic cyclizing reagent. This reaction is conventional, and proceeds in the usual manner, under normal operating conditions, using conventional acids, for example, phosphoric acid in the presence of a suitable solvent, and heating, or a sulfuric acid-acetic acid mixture at low temperature.

It is also possible to isomerize the cis-$\Delta^3$-pseudo ionone to the corresponding trans-$\Delta^3$-pseudo ionone by irradiation with ultraviolet light or by treatment with an isomerizing reagent, such as iodine. The isomerization can also be accomplished upon heating for extended periods. The isomerization takes place at room temperature, although elevated temperatures up to about 150°C. can be employed. Very small amounts of reagent are efective. As little as 0.2% reagent can be used. Isomerization is complete when amounts within the range from about 0.2 to 0.4% reagent is used. Amounts in excess of this, up to about 10%, can be employed, but no advantage appears to be obtained in doing so.

A preferred isomerizing reagent is an elemental halogen, such as bromine or iodine. Iodine is best used in solution in an inert solvent for iodine, such as isopropyl ether or ethyl ether, to facilitate contact with the cis-pseudo ionone or alkyl pseudo ionone.

In general, any acid or base or acidic or basic salt can be used as the isomerizing reagent, to effect isomerization of cis-$\Delta^3$ to trans-$\Delta^3$-pseudo ionone; acids include sulfonic acids such as paratoluene sulfonic acid, and octane sulfonic acid; carboxylic acids such as formic acid, acetic acid, trichloroacetic acid and propionic acid; inorganic acids such as nitric acid, phosphoric acid, sulfuric acid, and hydrochloric acid; and Lewis acids, such as $BF_3$. Bases include sodium hydroxide, potassium hydroxide, and ammonium hydroxide, and silver nitrate is an example of a salt.

Isomerization also can be effected by irradiation with ultraviolet light. The isomerization proceeds at room temperature under such irradiation and in a relatively short time, from 0.2 hour up to 10 hours.

Heating at an elevated temperature within the range from about 50° to about 150°C. can also isomerize the cis-$\Delta^3$ to trans-$\Delta^3$-pseudo ionone. Heating is sufficient by itself, although addition of an isomerizing reagent or irradiation with ultraviolet light may expedite the isomerization reaction.

It has also been observed that agitation at room temperature for several hours in the presence of copper nitrate converts the cis-$\Delta^3$-pseudo ionone to the trans-isomer.

By direct cyclization of the cis-$\Delta^3$-pseudo ionone with strong acids, a mixture containing large amounts of cis-($\alpha$-, $\beta$-, and $\gamma$-) ionone can be obtained. The cis-($\alpha$-, $\beta$-, and $\gamma$-) ionones have quite distinct olfactory characteristics, different from trans-$\alpha$-, $\beta$-, and $\gamma$-ionones, and are useful as perfume agents.

The following Examples in the opinion of the inventors represent preferred embodiments of the invention:

EXAMPLE 1

Dehydrolinalool (45.6 grams, 0.299 mol), 2-methoxypropene (64.8 grams, 0.894 mol) and cupric sulfate (anhydrous, 0.9 gram, 5.6 × 10$^{-3}$ mol) were combined in a pressure-resisting glass bottle. A magnetic stirring bar was added, and the bottle closed and immersed in an oil bath heated to 85° to 89°C. with a magnetic stirrer heater.

The reaction was continued for 39 hours, at which time gas-liquid chromatographic analysis showed that the product was composed mostly of cis-pseudo ionone. Consequently, the reaction was stopped, and the heterogeneous brown reaction mixture filtered warm through a Celite bed with the aid of benzene, and the solvent removed under aspirator suction. Flash distillation at 0.5 mm, 74° to 160°C. head temperature, 91° to 190°C. pot temperature, yielded 59.4 g of oil and 3.7 g of residue. Gas-liquid chromatographic analysis of this product showed:

|  | % by Weight |
|---|---|
| Low Boilers | 7.1 |
| Dehydrolinalool | trace |
| Unknown | 0.4 |
| Cis-$\Delta^3$-pseudo ionone | 86.2 |
| Trans-$\Delta^3$-pseudo ionone (cis-$\Delta^5$) | 1.5 |
| Trans-$\Delta^3$-pseudo ionone (trans-$\Delta^5$) | 3.7 |
| High Boilers | 1.1 |

The cis-$\Delta^3$-pseudo ionone does not match the gas-liquid chromatographic retention time of either of the trans-$\Delta^3$-isomers, which elute at 6.36 and 8.23 minutes, respectively, on a 10-foot by one-quarter inch 10% Carbowax 20M column at 190°C., He flow about 100 ml/min. Under the same conditions, the cis-$\Delta^3$-isomer elutes in 5.4 minutes. The cis-$\Delta^3$-isomer shows a lambda maximum at 292, E 18,400 in hexane, and 300, E 17,200 in ethanol. The $N_d^{20}$ is 1.5251. The IR spectra of the cis-$\Delta^3$ and trans-$\Delta^3$-pseudo ionones are dissimilar, as are the NMR spectra:

IR Spectra:

| Cis-$\Delta^3$-Pseudo Ionone | Trans-$\Delta^3$-($\Delta^5$-cis- and trans-) Pseudo Ionones - (As a Mixture of Nerolidene and Geranylidene Acetones) |
|---|---|
| 1690 cm$^{-1}$, strong | 1674 cm$^{-1}$, strong |
| 1627 ″ , strong | 1634 ″ , strong |
| 1578 ″ , strong | 1595 ″ , strong |
| 1433 ″ , medium | 1447 ″ , medium |
| 1380 ″ , medium | 1363 ″ , medium strong |
| 1356 ″ , strong | 1255 ″ , strong |
| 1253 ″ , medium weak | 1162 ″ , medium weak |

-Continued

| | % by Weight | | |
|---|---|---|---|
| 1177 " , strong | | 974 " , medium strong | |
| 967 " , medium | | 757 " , nil | |
| 757 " , medium | | | |

NMR Spectrum:

Cis-$\Delta^3$-Pseudo Iodone

Doublet centered at 1.6 ppm, 6 protons, isoprenyl methyls. Nonsymmetrical doublet centered at about 1.85 ppm, 2 protons, methylene group. Singlet at about 2.1 ppm, 3 protons, methyl ketone. Envelope under ketone methyl singlet centered at about 2.15 ppm, two protons, methylene group. Broad singlet centered about 5.1 ppm, 1 vinyl proton. Doublet centered at about 5.8 ppm, J=11, 1 vinyl proton. Triplet centered at 6.6 ppm (wings at 11.5 cps), 1 vinyl proton. Doublet centered at about 7.15 ppm, J about 11.5, 1 vinyl proton.

The amount of cis-pseudo ionone produced, 52.4 g, 0.273 mol, represented a yield of cis-pseudo ionone of 91.4%. The total yield of cis- and trans-pseudo ionones was 96.8%.

EXAMPLE 2

Example 1 was repeated, carrying out the reaction at 91°C. for 21 hours. The yield of cis-pseudo ionone obtained was 92.9%, and the total yield of pseudo ionone (cis- and trans-together) was 95.2%.

Gas-liquid chromatographic analysis of the product isolated showed the following:

| | % by Weight |
|---|---|
| Dehydrolinalool | 2.0 |
| Unknown | |
| Cis-$\Delta^3$-pseudo ionone | 90.6 |
| Trans-$\Delta^3$-pseudo ionone (cis-$\Delta^5$) | 0.6 |
| Trans-$\Delta^3$-pseudo ionone (trans-$\Delta^5$) | 1.4 |
| High Boilers | 1.1 |

EXAMPLE 3

Cis-$\Delta^3$-Pseudo Ionone

Into a pressure bottle equipped with a magnetic stirrer was charged 61.2 g of dehydrolinalool, 86.5 g of 2-methoxy propene and 1.2 g of anhydrous pulverized cupric sulfate. The mixture was stirred for 20.5 hours in an oil bath at 85° to 89°C. whereupon the tan reaction mixture was cooled, filtered with the aid of benzene to recover catalyst, and the low boilers removed under aspirator vacuum. Flash distillation at 1.4 to 0.9 mm Hg, 67° to 114°C. head temperature, 104° to 122°C. pot temperature, gave 79.2 g of distillate and 4.9 g of residue, showing the following gas-liquid chromatographic analysis:

| | % by Weight |
|---|---|
| Low Boilers | 7.1 |
| Unknown | 0.7 |
| Cis-$\Delta^3$-pseudo ionone | 83.7 |
| Trans-$\Delta^3$-pseudo ionone ($\Delta^5$, cis- and trans-) | 8.3 |
| High Boilers | 0.2 |

Yield: 85.7% Cis-$\Delta^3$-Pseudo Ionone
94.5% Total $\Delta^3$-Pseudo Ionone

EXAMPLE 4

The cis-$\Delta^3$-pseudo ionone obtained in Example 1 was isomerized to trans-$\Delta^3$-pseudo ionone. The cis-$\Delta^3$-pseudo ionone (86.2% cis, 5.2% trans) 10 g, and 0.4 g of a 5% solution of iodine in isopropyl ether were mixed, and the mixture allowed to stand for 2.1 hours at room temperature. The isopropyl ether was then removed under aspirator suction, and the oil flash-distilled at 0.3 and 1 mm, head temperature 70° to 130°C., pot temperature 96° to 168°C., to give 9.2 g distillate and 0.8 g residue. Gas-liquid chromatographic analysis of the distillate, as compared to the starting material, showed nearly complete rearrangement of the cis-$\Delta^3$-pseudo ionone to trans-$\Delta^3$-pseudo ionone, as the following analysis shows:

| | % By Weight | | | |
|---|---|---|---|---|
| | Cis | Trans | Low Boilers | High Boilers |
| Initial Mixture | 86.2 | 5.2 | 7.9 | 1.1 |
| Distillate | 5.4 | 87.2 | 5.6 | 1.8 |

EXAMPLE 5

Cyclization of Cis-$\Delta^3$-Pseudo Ionone to $\alpha$-Ionone

Into a three-necked 150 ml flask equipped with a mechanical stirrer, condenser, static nitrogen head and thermometer was charged 15 g of cis-$\Delta^3$-pseudo ionone (86.5% cis-$\Delta^3$-pseudo ionone, 5.8% trans-$\Delta^3$-pseudo ionone), 15 g of cyclohexane and 750 mg of 85% phosphoric acid. The mixture was heated to reflux (81° to 84°C.) for a total of 14 hours, and after cooling washed with water (200 ml) and saturated aqueous sodium bicarbonate (100 ml). The solution was then dried over Na$_2$SO$_4$, the solvent removed under aspirator vacuum and the remaining oil flash-distilled at 1.2 to 1.5 mm Hg, 66 to 110°C. head temperature, 87° to 160°C. pot temperature, to give 7.1 g of light yellow oil containing 10.5% cis-$\beta$-ionone, 2.4% cis-$\alpha$-ionone, 40.8% trans-$\alpha$-ionone and 12.8% trans-$\beta$-ionone.

EXAMPLE 6

A 5.0 g portion of cis-$\Delta^3$-pseudo ionone (86.2% cis-$\Delta^3$, 5.2% trans-$\Delta^3$) was isomerized to the trans-isomer by mixing with 0.1 g of a solution of 0.25 g H$_2$SO$_4$ in 5 g of methanol and allowing to stand at room temperature for 3 hours. The mixture was quenched in 40 ml of saturated sodium carbonate solution, and the organic phase taken up in benzene and washed with water. The organic phase was concentrated on aspirator vacuum and then flash-distilled at 0.2 to 0.5 mm Hg, 76° to 156°C. head temperature, 85° to 205°C. pot temperature, to give 0.5 g residue and 3.7 g distillate (9.3% cis-$\Delta^3$, 86.6% trans-$\Delta^3$) corresponding to a direct yield of 68.3% true yield 74.2%.

EXAMPLE 7

A one-gram portion of cis-$\Delta^3$-pseudo ionone (86.2% cis-$\Delta^3$, 5.2% trans-$\Delta^3$) was isomerized to the trans-isomer by mixing with 0.2 g of a solution of 0.25 g of para toluene sulfonic acid in 5 g of methanol, and allowing the homogeneous solution to stand at ambient temperature for 3 hours. Gas-liquid chromatographic analysis at the elapsed reaction times indicated showed the isomer distribution below:

| Elapsed Reaction Time (Hrs.) | Relative % Cis | Relative % Trans |
| --- | --- | --- |
| 0 | 94.2 | 5.7 |
| 0.25 | 29.7 | 70.3 |
| 0.75 | 10.7 | 89.2 |
| 1.5 | 6.1 | 93.9 |

EXAMPLE 8

One g cis-$\Delta^3$-pseudo ionone was isomerized to the trans-isomer by heating with 1.5 g HOAc at 62° to 68°C. for 12.5 hours. Gas-liquid chromatographic analysis at the elapsed reaction times indicated showed the isomer distribution below:

| Elapsed Reaction Time (Hrs.) | Relative % Cis | Relative % Trans |
| --- | --- | --- |
| 0 | 93.7 | 6.1 |
| 8.0 | 20.4 | 79.3 |
| 12.5 | 6.9 | 93.1 |

EXAMPLE 9

One g of 6,10-dimethyl-cis-$\Delta^3$-5,9-undecatrien-2-one was isomerized to the trans-isomer using 1 g of a solution of 1 g NaOH in 25 ml of MeOH. The mixture was allowed to stand at ambient temperature for 5.25 hours. Gas-liquid chromatographic analysis at the elapsed reaction times shown gave the isomer ratios:

| Elapsed Reaction Time (Hrs.) | Relative % Cis | Relative % Trans |
| --- | --- | --- |
| 0 | 93.7 | 6.1 |
| (0.5 to 1.0 min.) | 45.7 | 54.3 |
| 0.88 | 18.8 | 81.2 |
| 5.25 | 7.4 | 92.6 |

EXAMPLE 10

One g of cis-$\Delta^3$-pseudo ionone was isomerized to the trans-isomer by mixing with 1 drop of BF$_3$ etherate and allowing to stand at ambient temperature for 22.3 hours. Gas-liquid chromatographic analysis of samples taken at the elapsed reaction times shown had the following isomer ratios:

| Elapsed Reaction Time (Hrs.) | Relative % Cis | Relative % Trans |
| --- | --- | --- |
| 0 | 93.7 | 6.1 |
| 1.0 | 70.0 | 30.0 |
| 5.5 | 49.0 | 51.0 |
| 22.3 | 25.2 | 74.8 |

EXAMPLE 11

One g of cis-$\Delta^3$-pseudo ionone was isomerized to the trans-isomer using 1 g of a solution of 1 g AgNO$_3$, 4g H$_2$O and 25 ml MeOH. The mixture was allowed to stand at ambient temperature for 21.8 hours. Gas-liquid chromatographic analysis of samples taken at the elapsed reaction times shown below gave the isomer ratios:

| Elapsed Reaction Time (Hrs.) | Relative % Cis | Relative % Trans |
| --- | --- | --- |
| 0 | 93.7 | 6.1 |
| 1.7 | 80.3 | 19.7 |
| 21.8 | 12.6 | 77.4 |

EXAMPLE 12

Into a pressure vessel was placed 0.3 g of cupric sulfate which had been recovered from a previous run, 15.2 g of dehydrolinalool and 21.6 g of 2-methoxy propene. The mixture was heated to 83°–89°C. with stirring for a total of thirteen hours, cooled, filtered, and washed with water prior to evaporation of volatiles at 40 mm to 50°C. Flash distillation of the remaining oil at 1.0 to 0.5 mm, 60° to 138°C. head temperature, and 100° to 180°C. pot temperature gave 18.1 g of yellow oil containing 0.04 g of dehydrolinalool, 15.4 g of cis-$\Delta^3$-pseudo ionone and 0.8 g of trans-$\Delta^3$-pseudo ionone.

EXAMPLE 13

Isomerization of Cis-$\Delta^3$-Pseudo

Ionone to Trans-$\Delta^3$-Pseudo

Ionone and Cyclization to $\beta$-Ionone.

A. A 15.0 g portion of cis-$\Delta^3$-pseudo ionone (89.7% cis-$\Delta^3$, 2.0% trans-$\Delta^3$) was combined with 1.2 g of 5% iodine in isopropyl ether, and allowed to stand at ambient temperature for 50 minutes, at which point another 0.2 g of the iodine solution was added. After another 20 minutes, 0.2 g more of the iodine solution was added, and twenty minutes later the solvent was removed under aspirator vacuum.

B. Into a 100 ml flask equipped with a thermometer and magnetic stirrer was placed 52.5 g of 95% H$_2$SO$_4$ and 22.5 g of acetic acid. After cooling to 12°C., the oil from step A was added dropwise, with stirring, over one hour at 10° to 18°C. The mixture was quenched ten minutes after the addition was completed by pouring into 300 ml of H$_2$O and 50 ml of benzene, with stirring.

The organic phase was separated, and washed with 40 ml of saturated aqueous Na$_2$CO$_3$ solution in 100 ml of H$_2$O, and then with a 50 ml portion of water. The solvent was removed under aspirator vacuum, and the oily product flash-distilled at 1 to 2 mm Hg, 65° to 142°C. head temperature, and 95° to 212°C. pot temperature, to give 11.9 g of distillate and 1.2 g of residue. The direct yield of $\beta$-ionone was 43.2%, true yield 67.7%. Gas-liquid chromatographic analysis showed:

| Components | Starting Material (%) | Distilled Product (%) |
| --- | --- | --- |
| Dehydrolinalool | 2.0 | 0.7 |
| Cis-$\Delta^3$-pseudo ionone | 89.1 | Trace |
| Trans-$\Delta^3$-pseudo ionone | 2.0 | 41.7 |
| $\beta$-ionone | — | 49.5 |
| Unknown | 1.1 | 3.9 |

EXAMPLE 14

Cis-$\Delta^3$-Isomethyl Pseudo Ionone 34° -methyl-cis-$\Delta$

Into a pressure bomb was charged 15.2 g of dehydrolinalool, 36.4 g of a mixture of 2-ethoxy-$\Delta^1$-and $\Delta^2$- butenes, and 0.3 g of anhydrous pulverized cupric sulfate. The mixture was stirred at 87° to 89°C. for a total of 70.3 hours, cooled, and filtered through a Celite bed with the aid of cyclohexane. The organic phase as washed twice with equal volumes of water, dried over sodium sulfate, and stripped of low boilers on aspirator vacuum. Flash distillation of the remaining oil at 0.4 to 0.8 mm Hg, pot temperature 64° to 180°C., head temperature 34 to 114°C., gave 17.5 g of yellow oil containing 51.1% of a mixture of 3-methyl-cis -$\Delta^3$-pseudo ionone and 1-methyl-cis-$\Delta^3$-pseudo ionone, and 9.5% of mixed trans-$\Delta^3$, cis- and trans-$\Delta^5$-methyl pseudo ionones.

EXAMPLE 15

Isomerization of Cis-$\Delta^3$-Pseudo Ionone to Trans-$\Delta^3$-Pseudo Ionone and Cyclization of $\beta$-Ionone.

A 5.0 g portion of cis-$\Delta^3$-pseudo ionone (83.7% cis-$\Delta^3$, 8.3% trans-$\Delta^3$) was treated with 0.5 g of acetic acid at 95 to 120°C. for 2.3 hours. A mixture of 17.5 g of 95% $H_2SO_4$ and 7 g acetic acid was cooled to 4°C. and the above oil in acetic acid added dropwise over 47 minutes, at a temperature range between 4° and 18°C., with stirring. The mixture was then poured into water and extracted with benzene. The benzene extracts were washed in succession with water, saturated aqueous sodium bicarbonate solution, and again water, prior to concentration under aspirator vacuum. Flash distillation of the remaining oil at 1.5 mm Hg, head temperature 30° to 122°C., pot temperature 92° to 185°C., gave 4.1 g of distillate containing 84.8% $\beta$-ionone. Yield 70%.

EXAMPLE 16

Cis-$\Delta^4$-3-Keto-7-Methyl-4,6-Octadiene and Cis-$\Delta^3$-2-Keto-3,6-Dimethyl-3,5-Heptadiene.

Into a pressure bottle was charged 8.4 g of 3-hydroxy-3-methyl-1-butyne, 30.3 g of mixed $\Delta^1$-and $\Delta^2$-2-ethoxy-butenes, and 0.3 g of anhydrous pulverized cupric sulfate. The mixture was heated at 85° to 90°C. for a total of 151 hours, with stirring, and then cooled, and filtered with the aid of cyclohexane. The filtrate was washed three times with water, dried over sodium sulfate, and stripped of low boilers at 40 mm Hg. Flash distillation at 1.0 to 0.3 mm Hg, 38° to 120°C. head temperature, 56° to 160° pot temperature, gave 12.4 g of yellow oil containing 3.3 % 3-methyl-1-butyne-3-ol, 61.8% cis-$\Delta^4$ -3-keto-7-methyl-4,6-octadiene and 11.4% cis-$\Delta^3$-2-Keto-3,6-dimethyl-3-5-heptadiene.

EXAMPLE 17

Cyclization of Cis-$\Delta^3$-Pseudo Ionone to $\beta$-Ionone.

A mixture of 52.5 g of 95% sulfuric acid and 22.5 g of acetic acid was cooled to 9°C., whereupon 15.0 g of cis-pseudo ionone (83.7% cis-$\Delta^3$, 8.3% trans-$\Delta^3$) was added dropwise with efficient stirring over 40 minutes at 9° to 13°C. The reaction mixture was quenched immediately by stirring into a mixture of 80 ml ether and 300 ml ice water. The organic phase was washed with saturated aqueous sodium bicarbonate solution, dried over sodium sulfate and concentrated under aspirator vacuum. Flash distillation of the remaining oil at 1.0 mm Hg, 82° to 172°C. head temperature, 91° to 204°C. pot temperature, gave 10.5 g of yellow oil which contained 22.0% cis-$\alpha$-ionone, 38.5% cis-$\beta$-ionone, 1.1% trans-$\alpha$-ionone, and 22.1% trans-$\beta$-ionone. One ml of the above distillate was treated with one ml of 5% iodine in isopropyl ether, to give an oil showing by gas-liquid chromatographic analysis: 8.4% cis-$\alpha$-ionone, 2.6% cis-$\beta$-ionone, 2.6% trans-$\alpha$-ionone, and 72.7% trans-$\beta$-ionone.

EXAMPLE 18

Cis-$\Delta^3$-6-Ethyl-7,10-Dimethyl-2-Keto-3,5,9-Undecatriene.

Into a pressure vessel was charged 9.0 g of 3-ethyl-3-hydroxy-4,7-dimethyl-1-octyn-ene-6, 12.4 g of 2-methoxy propene and 0.15 g of cupric sulfate. The mixture was heated at 88°C. for 32.5 hours with stirring, cooled, and then washed with $H_2O$ prior to stripping under aspirator vacuum. Flash distillation of the remaining oil at 1.0 mm Hg, head temperature 66° to 180°C., pot temperature 99° to 210°C., gave 21.8 g of oil containing 21.1% starting alkynol, 55.3% cis-$\Delta^3$-6-ethyl-7,10-dimethyl-3,5,9-undecatriene and 6.3% trans-$\Delta^3$-6-ethyl-7,10-dimethyl-2-keto-3,5,9-undecatriene.

| Direct yield | = 50% |
|---|---|
| True yield | = 62.4% |

The product showed IR bands at 1,690 cm$^{-1}$, 1,627 cm$^{-1}$, and 1,578 cm$^{-1}$, confirming the $\Delta^3$-structure.

EXAMPLE 19

Ultraviolet Light Isomerization

A 2 g sample containing 91.8% cis-$\Delta^3$-pseudo ionone and 8.3% trans-$\Delta^3$-pseudo ionone was placed on a 160 mm watch glass, and irradiated for 18 hours at 27°C. under a C.E. germicidal G15 T8 lamp installed in a 15-watt Rad-I-Airco cycle, 0.36 amp., 118 volt A.C., 181-15 unit. After the 18-hour irradiation period, the ratio in percent of cis-$\Delta^3$-ionone was 6.3% and the trans-$\Delta^3$-ionone was 93.7%.

EXAMPLE 20

Into a pressure vessel equipped with a magnetic stirrer was combined 18.0 g of a mixture of 3,4,4,7-tetramethyl-3-hydroxyl-1-octyn-6-ene and 3-isopropyl-7-methyl-3-hydroxy-1-octyn-6-ene, 22.0 g of 2-methoxy propene and 0.3 g of cupric sulfate. The mixture was heated at 85° to 90°C. for a total of 289 hours, cooled, filtered and lights removed under aspirator vacuum. Flash distillation gave 13.9 g of distillate (7.1 g residue) which contained 2.1 g of starting alkynols and 9.1 g of mixed 2-keto-6-isopropyl-10-methyl-3,5,9-undecatriene and 2-keto-6,7,7,10-tetramethyl-3,5,9-undecatriene. The product showed IR bands for both cis- and trans-pseudo ionones.

| Direct yield | — 41.3% |
|---|---|
| True yield | — 44.3% |

EXAMPLE 21

Into a pressure vessel equipped with a magnetic stirrer was combined 8.4 g of 2-methyl-3-butyn-2-ol, 21.6 g of 2-methoxy-propene and 0.3 g of cupric sulfate. The mixture was heated at 90°C. for a total of 157.3 hours, cooled, filtered, washed with water and the lights removed under aspirator vacuum. Flash distillation gave 10.2 g of distillate (2.4 g residue) which contained 0.9 g of starting alcohol, 8.2 g of 2-keto-6-methyl-$\Delta^3$-cis-$\Delta^5$-heptadiene and 1.5 g of 2-keto-6-methyl-$\Delta^3$-trans-$\Delta^5$-heptadiene. The yield of methyl heptadienes was 78%. The product showed IR bands for both cis- and trans-heptadienones.

EXAMPLE 22

Into a metal pressure vessel equipped with a magnetic stirrer was combined 5.0 g of cis-pseudo ionone (77.4% $\Delta^3$-cis, 22.6% $\Delta^3$-trans) and 95.0 g of toluene. The mixture was heated at 150°C. for a total of 23.1 hours to give a mixture of 20.4% $\Delta^3$-cis-pseudo ionone and 79.5% $\Delta^3$-trans-pseudo ionone by gas-liquid chromatography.

Having regard to the foregoing disclosure, the following is claimed as the inventive and patentable embodiments thereof:

1. A process for preparing cis-$\Delta^3$-pseudo ionones and cis-$\Delta^3$-pseudo methyl ionones from dehydrolinalool and lower alkyl or alkenyl derivatives thereof by condensation with an isopropenyl or isobutenyl lower alkyl ether, comprising condensing dehydrolinalool or a lower alkyl or alkenyl derivative thereof having the formula:

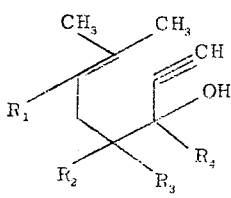

wherein $R_1$, $R_2$, $R_3$ and $R_4$ are selected from the group consisting of hydrogen, lower alkyl and lower alkenyl having from one to about four carbon atoms and an isopropenyl or isobutyl lower alkyl ether in the presence of cupric sulfate at a reaction temperature within the range from about 80° to about 150°C., thereby obtaining a cis-$\Delta^3$-pseudo ionone or a cis-$\Delta^3$-pseudo methyl ionone.

2. A process according to claim 1, in which the reaction time is from 0.2 to about 72 hours.

3. A process according to claim 1, in which dehydrolinalool is condensed.

4. A process according to claim 1, in which dehydrolinalool is condensed with an isopropenyl ether to form pseudo ionone.

5. A process according to claim 1, in which dehydrolinalool is condensed with an isobutenyl ether to form iso and normal pseudo methyl ionone.

6. A process according to claim 1, in which the amount of cupric sulfate is within the range from about 0.1 to about 10% by weight of the reaction mixture.

7. A process according to claim 1, in which the reaction temperature is from 85° to 125°C.

8. A process for preparing α,β-ethylenic ketones, which comprises condensing a tertiary acetylenic carbinol having the formula:

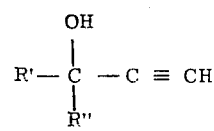

wherein:
a. R' is selected from the group consisting of:

(i)

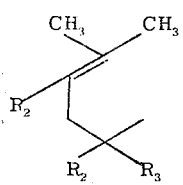

wherein $R_1$, $R_2$ and $R_3$ are selected from the group consisting of hydrogen, lower alkyl and lower alkenyl having from one to about four carbon atoms;

(ii)

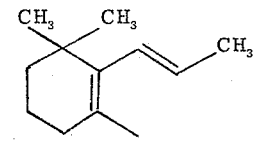

(iii)

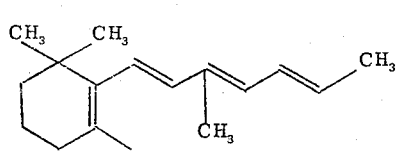

(iv)

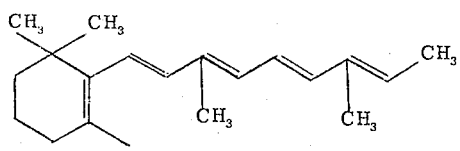

b. R'' is selected from the group consisting of lower alkyl and lower alkenyl having from one to about four carbon atoms with an isopropenyl or isobutenyl lower alkyl ether in the presence of cupric sulfate at a reaction temperature within the range from about 80° to about 150° C., thereby obtaining an α,β-ethylenic ketone.

9. A process according to claim 14, in which R' is:

(i)
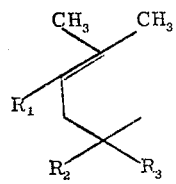

wherein $R_1$, $R_2$ and $R_3$ are selected from the group consisting of hydrogen, lower alkyl and lower alkenyl having from one to about four carbon atoms;
  b. R'' is lower alkyl.

10. A process according to claim 8, in which the reaction time is from 0.2 to about 72 hours.

11. A process according to claim 8, in which the amount of cupric sulfate is within the range from about 0.1 to about 10% by weight of the reaction mixture.

12. A process according to claim 8, in which the reaction temperature is from 85° to 125°C.

13. A process according to claim 8, in which the tertiary acetylenic carbinol is condensed with an isopropenyl lower alkyl ether.

14. A process according to claim 8, in which the tertiary acetylenic carbinol is condensed with an isobutenyl lower alkyl ether.

* * * * *

UNITED STATES PATENT OFFICE
CERTIFICATE OF CORRECTION

Patent No. 3,886,217                    Dated May 27, 1975

Inventor(s) Robert S. DeSimone et al

It is certified that error appears in the above-identified patent and that said Letters Patent are hereby corrected as shown below:

| | | |
|---|---|---|
| Column 1, line 13 | : | delete "so" after --literature-- |
| Column 3, line 14 | : | "cis-66³-" should be --cis-$\Delta^3$-- |
| Column 13, line 15 | : | "present" should be --presence-- |
| Column 13, line 34 | : | "efective" should be --effective-- |
| Column 15, line 8 | : | "Iodone" should be --Ionone-- |
| Column 18, line 65 | : | delete "34°-methyl-cis-$\Delta$" |
| Column 19, line 4 | : | "as" should be --was-- |

UNITED STATES PATENT OFFICE
CERTIFICATE OF CORRECTION

Patent No. 3,886,217   Dated May 27, 1975

Inventor(s) Robert S. De Simone et al

It is certified that error appears in the above-identified patent and that said Letters Patent are hereby corrected as shown below:

Column 22, line 19, claim 8 :

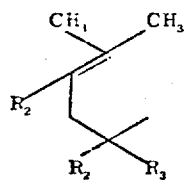

should be

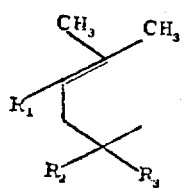

Column 23, line 1, claim 9 :   "14" should be --8--

Signed and Sealed this twentieth Day of April 1976

[SEAL]

Attest:

RUTH C. MASON  
Attesting Officer

C. MARSHALL DANN  
Commissioner of Patents and Trademarks